United States Patent
Naito

(10) Patent No.: US 7,681,612 B2
(45) Date of Patent: Mar. 23, 2010

(54) RUN-FLAT SUPPORTING BODY AND TIRE/WHEEL ASSEMBLY

(75) Inventor: Mitsuru Naito, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 440 days.

(21) Appl. No.: 11/665,228

(22) PCT Filed: Nov. 28, 2005

(86) PCT No.: PCT/JP2005/021779

§ 371 (c)(1),
(2), (4) Date: Apr. 12, 2007

(87) PCT Pub. No.: WO2006/057383

PCT Pub. Date: Jun. 1, 2006

(65) Prior Publication Data
US 2008/0035262 A1 Feb. 14, 2008

(30) Foreign Application Priority Data
Nov. 29, 2004 (JP) ............................... 2004-344469

(51) Int. Cl.
B60C 17/04 (2006.01)
B60C 17/06 (2006.01)

(52) U.S. Cl. .................. 152/156; 152/158; 152/520

(58) Field of Classification Search .................. 152/156, 152/158, 520; 428/596, 597
See application file for complete search history.

(56) References Cited

U.S. PATENT DOCUMENTS

| | | | | |
|---|---|---|---|---|
| 661,615 A | * | 11/1900 | Marwick et al. | 428/597 |
| 1,053,614 A | * | 2/1913 | Layne | 428/596 |
| 3,587,702 A | * | 6/1971 | Kaunitz | 152/158 |
| 5,660,653 A | * | 8/1997 | Gardetto | 152/520 |
| 7,287,566 B2 | * | 10/2007 | Naito et al. | 152/520 X |
| 2006/0196589 A1 | * | 9/2006 | Izumoto et al. | 152/520 |

FOREIGN PATENT DOCUMENTS

| | | | |
|---|---|---|---|
| JP | 11-333530 | | 12/1999 |
| JP | 2002-120026 | | 4/2002 |
| JP | 2004-050981 | | 2/2004 |
| JP | 2004-051013 | | 2/2004 |
| JP | 2004051088 A | * | 2/2004 |
| WO | WO-2004/026596 A1 | * | 4/2004 |
| WO | WO-2004/074015 A1 | * | 9/2004 |

* cited by examiner

Primary Examiner—Adrienne C Johnstone
(74) Attorney, Agent, or Firm—Greer, Burns & Crain, Ltd.

(57) ABSTRACT

The run-flat supporting body (1) is configured of the annular shell (2) and elastic rings (3) and (3). The annular shell (2) works as a supporting surface on an outer peripheral side, and bifurcates into two leg portions on an inner peripheral side. In addition, the annular shell (2) is provided with a large number of the through holes (4) in wall surfaces thereof. The elastic rings (3) and (3) are attached respectively to the two leg portions of the annular shell (2). The run-flat supporting body 1 is supported on a rim of a wheel with the elastic rings (3) and (3). According to a configuration of the present invention, peripheries of the respective through holes (4) are thickened, residual stresses are applied to the peripheries of the respective through holes (4), or each through hole (4) is formed into an elliptic shape having the major axis in a circumferential direction.

5 Claims, 3 Drawing Sheets (a)

(b)

(c)

(d)

(e)

RUN-FLAT SUPPORTING BODY AND TIRE/WHEEL ASSEMBLY

TECHNICAL FIELD

The present invention relates to a run-flat supporting body and a tire/wheel assembly. More specifically, the present invention relates to a run-flat supporting body having excellent durability while provided with a large number of through holes in an annular shell thereof, and also to a tire/wheel assembly.

BACKGROUND ART

As a measure for enabling emergency running at the time when a pneumatic tire is punctured during the running of a vehicle, many measures have heretofore been known, in which a core-type run-flat supporting body is inserted into a cavity of a pneumatic tire, and thus supports an applied load.

Among such core-type run-flat support bodies, in particular, there is a run-flat supporting body, in which a main body is composed of an annular shell whose cross section in a tire width direction bifurcates into right and left leg portions, and in which elastic rings are attached to both of the leg portions for supporting the run-flat supporting body on a rim seat. Such a run-flat supporting body can be employed to the existing wheel as it is without adding a structural modification thereto. Accordingly, it is expected that use will be made of the run-flat supporting body described above in the future.

The above-described run-flat supporting body has had an advantage that previously attaching the run-flat supporting body to the wheel ensures safe running of the vehicle at the time when the tire is punctured. On the contrary, the run-flat supporting body has also had a disadvantageous point that the attachment thereof causes a deterioration of fuel economy since the attachment brings a weight increase of the vehicle.

As a countermeasure against the disadvantage, there is a proposal to achieve a weight reduction of the run-flat supporting body by providing a large number of through holes in the annular shell (refer to Patent Document 1).

Specifically, not only does such provision of the through holes contribute to the weight reduction, but also it allows the air to flow between the inside and outside of the annular shell. This makes it possible to appropriately maintain temperature distribution in the cavity of the tire during the running. The provision of the through holes thus can contribute to the safe running, and is preferable from the perspective of this point.

Patent Document 1: Japanese Patent Application Kokai publication No. 2004-51088

DISCLOSURE OF INVENTION

However, when a large number of through holes are provided to an annular shell, stresses concentrate on portions of the through holes owing to loads applied to the annular shell during run-flat running. Accordingly, there has been a problem that cracks are prone to occur starting from the through holes, resulting in shortening of durability time length of the annular shell.

The present invention has been made in order to solve the foregoing conventional problem. It is an object of the present invention to provide a novel run-flat supporting body having excellent durability while provided with a large number of through holes in an annular shell, and a tire/wheel assembly including such a run-flat supporting body.

For the purpose of achieving the above-described common object, the present invention provides the following three inventions regarding a structure of a run-flat supporting body and an invention regarding a structure of the tire/wheel assembly using the run-flat supporting body. Note that, these three inventions regarding the structure of the run-flat supporting body achieve the common object by the respective specific technical means. Target effects of the present invention can be obtained even if the run-flat supporting body is configured by using only a single one of these inventions. Moreover, one run-flat supporting body can also be configured by appropriately combining a plurality of these inventions, and in this case, higher effects can be obtained.

A description will be made below of each invention.

First, a run-flat supporting body according to the first invention has a configuration according to the following description (1):

(1) A run-flat supporting body is characterized by including an annular shell and elastic rings. The annular shell works as a supporting surface on an outer peripheral side, and bifurcates into two leg portions on an inner peripheral side. In addition, the annular shell is provided with a large number of through holes in wall surfaces thereof. The elastic rings are attached respectively to the two leg portions of the annular shell, and support the run-flat supporting body on a rim of a wheel. In the run-flat supporting body, peripheries of the respective through holes are more thickened than an outer region outside the peripheries of the respective through holes.

Moreover, preferably, the run-flat supporting body according to the first invention described above has a specific configuration according to any one of the following descriptions (2) to (5).

(2) The run-flat supporting body according to the description (1) is characterized in that edges of the respective through holes are chamfered.

(3) The run-flat supporting body according to any one of the descriptions (1) and (2) is characterized in that the thickness of the periphery of each through holes is made 1.3 to 1.8 times larger than that of the outer region.

(4) The run-flat supporting body according to the description (1) is characterized in that a peripheral wall surface of each through hole is bent or folded back on any one side of the peripheral wall surface.

(5) The run-flat supporting body according to the description (1) is characterized in that a reinforcement member is bonded to the peripheral wall surface of each through hole.

Moreover, the run-flat supporting body according to the second invention has a configuration according to the following description (6).

(6) A run-flat supporting body is characterized by including an annular shell and elastic rings. The annular shell works as a supporting surface on an outer peripheral side, and bifurcates into two leg portion on an inner peripheral side. In addition, the annular shell is provided with a large number of through holes in wall surfaces thereof. The elastic rings are attached respectively to the two leg portions of the annular shell, and support the run-flat supporting body on a rim of a wheel. In the run-flat supporting body, residual stresses are locally applied to peripheries of the through holes.

Moreover, the run-flat supporting body according to the third invention has a configuration according to the following description (7).

(7) A run-flat supporting body is characterized by including an annular shell and elastic rings. The annular shell works as a supporting surface on an outer peripheral side, and bifurcates into two leg portion on an inner peripheral side. In addition, the annular shell is provided with a large number of through holes in wall surfaces thereof. The elastic rings are attached respectively to the two leg portions of the annular shell, and support the run-flat supporting body on a rim of a wheel. In the run-flat supporting body, each through hole is formed into an elliptic shape, and the major axis of the elliptic shape is directed in a circumferential direction of the annular shell.

Moreover, the tire/wheel assembly according to the present invention has a configuration according to the following description (8).

(8) A tire/wheel assembly is characterized in that the run-flat supporting body according to any one of the descriptions (1) to (7) is attached to the inside of a pneumatic tire mounted on a rim of a wheel.

In the first invention of the above-described run-flat supporting body according to the present invention, the peripheries of the respective through holes are thickened, and the stresses to be concentrated on the through holes during the run-flat running are thereby spread and absorbed, thus making it possible to prevent the occurrence of the cracks starting from the through holes. In such a way, the durability of the run-flat supporting body is enhanced.

Moreover, in the second invention, since the residual stresses are previously applied to the peripheries of the through holes, the stresses to be concentrated on the through holes during the run-flat running can be spread in the same way, thus making it possible to prevent the occurrence of the cracks. In such a way, the durability of the run-flat supporting body is enhanced.

Furthermore, in the third invention, each through hole is formed into the elliptic shape, and the major axis direction is directed in the circumferential direction of the annular shell. Accordingly, the stresses to be concentrated on the through holes during the run-flat running are made to be spread on long hole walls extended in the circumferential direction of the through holes, thus making it possible to prevent the occurrence of the cracks more efficiently. In such a way, the durability of the run-flat supporting body is enhanced.

Moreover, the tire/wheel assembly according to the present invention has the run-flat supporting body in which the durability is enhanced as described above. Accordingly, the tire/wheel assembly in which the durability during the run-flat running is extremely good can be provided.

DESCRIPTION OF REFERENCE NUMERALS

Figure 1:
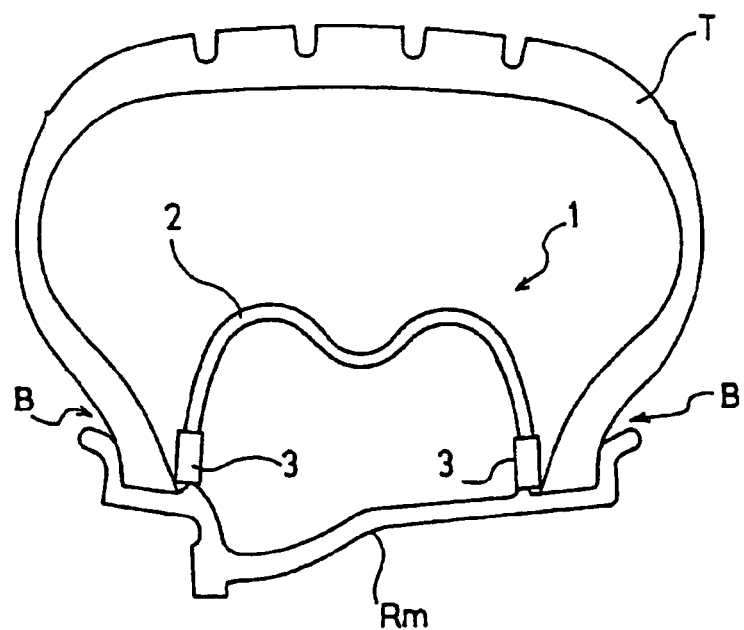
FIG. 1 is a cross-sectional view showing a main portion of a tire/wheel assembly to which a run-flat supporting body according to an embodiment of the present invention is attached.

1: run-flat supporting body
2: annular shell
3: elastic ring
4: through hole
5a, 5b: jig
6a, 6b: reinforcement member
T: pneumatic tire
Rm: rim

BEST MODES FOR CARRYING OUT THE INVENTION

A description will be made below in detail of a configuration of a run-flat supporting body of the present invention while referring to the accompanying drawings.

Figure 2:
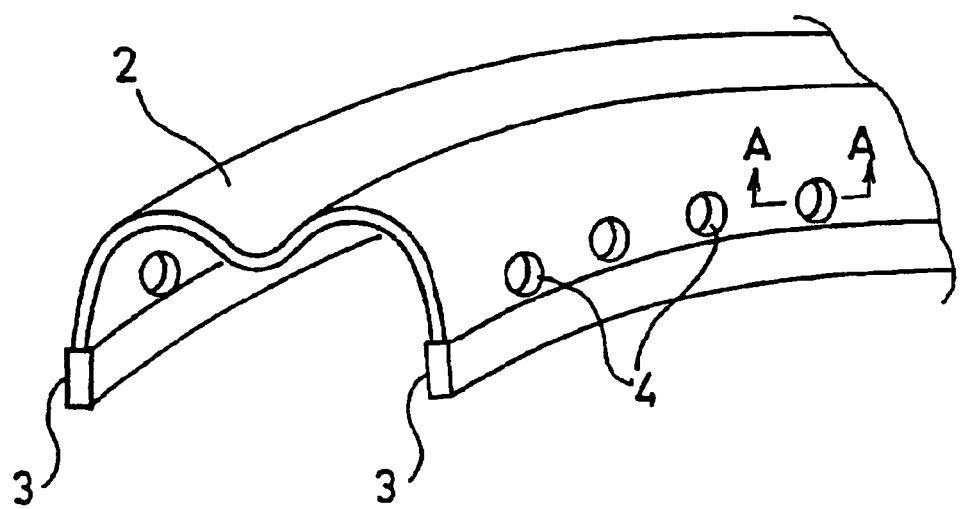
FIG. 2 is a perspective view enlargedly showing a part of an annular shell and elastic rings of the run-flat supporting body according to the embodiment of the present invention.

FIG. 1 is a cross-sectional view showing a main portion of a tire/wheel assembly to which a run-flat supporting body 1 according to an embodiment of the present invention is attached, and FIG. 2 is a perspective view enlargedly showing a part of the run-flat supporting body of FIG. 1.

In FIG. 1, the tire/wheel assembly (wheel) is composed in such a manner that a pneumatic tire T attaches bead portions B and B thereof to a rim Rm of a wheel. The run-flat supporting body 1 is inserted into the inside of the pneumatic tire T. The run-flat supporting body 1 includes an annular shell 2, and elastic rings 3 and 3 attached to both right and left leg portions thereof. As shown in FIG. 2, a number of through holes 4 are formed in wall surfaces of the annular shell 2.

Note that, in FIG. 2, the through holes 4 are arranged in a circumferential direction along the elastic rings 3 and 3; however, the arrangement of the through holes 4 is not limited to this.

The run-flat supporting body 1 of the present invention is composed of the above-described three inventions. In the first invention, peripheries of the respective through holes 4 formed in the annular shell 2 are more thickened than an outer region outside the peripheries of the respective through holes. In such a way, stresses to be concentrated on the through holes 4 during run-flat running are spread and absorbed, thus making it possible to prevent an occurrence of cracks starting from the through holes.

Specifically, as shown in FIG. 3(a), the thickness 4d of the peripheries of the respective through holes 4 formed in the annular shell 2 are made larger than a thickness 2d of a main body of the annular shell 2, is which is the outer region outside the peripheries of the through holes 4. In order to make the thickness 4d of the periphery of the through hole 4 larger as described above, it is recommended that a jig 5a be inserted into the through hole 4, and that the diameter of the through hole 4 be enlarged while rotating the jig 5a in an arrow direction.

Moreover, in the above-described embodiment, it is recommended that edges 2c of the through hole 4 be chamfered. In such a way, an occurrence of damage to the inner wall of the tire can be prevented when the tire T is mounted on a rim. Moreover, it is recommended that the thickness 4d of the periphery of each through hole 4 be made 1.3 to 1.8 times larger than the thickness 2d of the wall surfaces of the main body of the annular shell 2. In such a way, the occurrence of the cracks from the through holes 4 during the run-flat running can be prevented far more efficiently.

Figure 3:
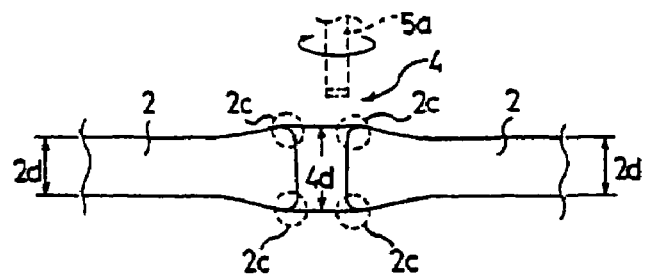
FIGS. 3(a) to 3(e) are, respectively, cross-sectional views of main portions for explaining form examples of through holes formed in wall surfaces of the annular shell in the run-flat supporting body according to the embodiment of the present invention, which are cross-sectional views of main portions, taken along the line A-A in an arrow direction in FIG. 2.
Figure 3:
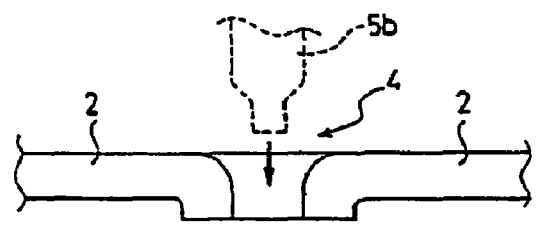
Figure 3:
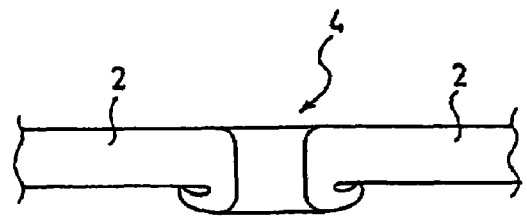
Figure 3:
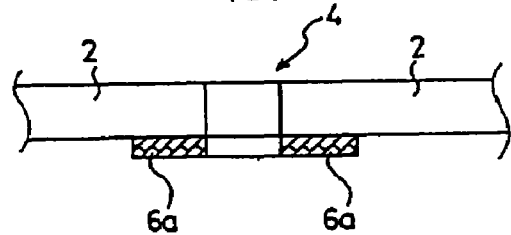
Figure 3:
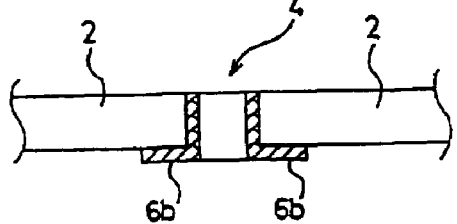

FIGS. 3(b) and 3(c) are views showing another embodiment of thickening the periphery of the through hole 4. In this embodiment, the peripheral wall surface of each through hole 4 is bent or folded back to any one side of the annular shell 2. In order to bend or fold back the peripheral wall surface of each through hole 4 as described above, it is recommended that the jig 5b be inserted into the through hole 4 while pressing or rotating the jig 5b, and that the diameter of the through hole 4 be enlarged. Note that, though FIGS. 3(*b*) and 3(*c*) show the case where the peripheral wall surface of the through hole 4 is bent or folded back to the inside of the annular shell 2, the peripheral wall surface may be bent or folded back to the outside of the annular shell 2.

Moreover, FIGS. 3(*d*) and 3(*e*) show still another embodiment of thickening the peripheries of the through holes 4. In this embodiment, reinforcement members 6*a* and 6*b* are individually bonded to the peripheral wall surfaces of the through holes 4, respectively. A material of the reinforcement members 6*a* and 6*b* and means for bonding the reinforcement members 6*a* and 6*b* are not particularly limited; however, it is recommended to bond a material the same as that of the annular shell 2 or a material having similar ductility to that of the annular shell 2. Alternatively, it is recommended to fuse a carbon steel, an iron alloy, a copper alloy, an aluminum alloy, a magnesium alloy, a titanium alloy, or the like by a method such as friction welding.

Moreover, in the second invention of a run-flat supporting body 1 of the present invention, a residual stress is locally applied to the periphery of a through hole 4, and the periphery of the through hole 4 is thereby reinforced.

In order to apply the residual stress, it is recommended to employ means for performing, for example, a shot peening treatment for striking the peripheral wall surfaces of the through hole 4 with numberless hard spherical particles (for example, steel-made balls) by jetting the particles together with a compressed air, and the like. Such positive application of the residual stress in advance spreads and absorbs the stress to be concentrated on the through hole 4 during the run-flat running, thus making it possible to prevent the occurrence of the cracks.

Note that, the shot peening treatment refers to a treatment for jetting the numberless hard spherical particles (for example, steel-made balls) onto the surface (peripheral wall surface of the through hole 4 of the annular shell in the present invention) of a steel member or the like together with the compressed air or for striking the surface concerned with the spherical balls by centrifugal force or the like, thereby generating the residual stresses. On the surface subjected to the treatment concerned, a substantially uniform compression residual stress is generated owing to a superposition of the residual stresses brought by the numberless shots, thereby allowing the periphery of the through hole 4 to hold the residual stress concerned.

Figure 4:
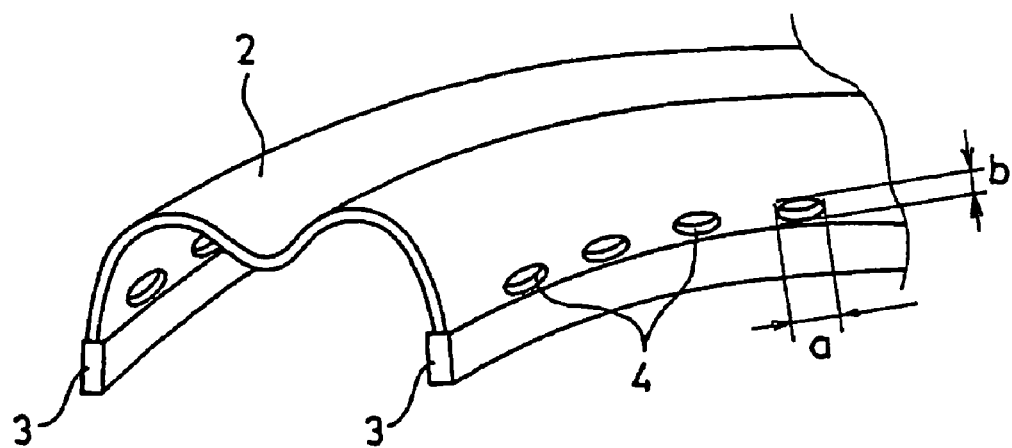
FIG. 4 is a perspective view enlargedly showing a part of an annular shell and elastic rings of a run-flat supplying body according to another embodiment of the present invention.

Moreover, in the third invention of a run-flat supporting body 1 of the present invention, as shown in FIG. 4, each through hole 4 formed on the wall surfaces of an annular shell 2 is formed into an elliptic shape, and the major axis of the elliptic shape is directed in a circumferential direction of the annular shell 2. Specifically, cracks starting from the through holes 4 during the run-flat running are prone to occur in a width direction of the annular shell 2. Accordingly, the through hole 4 is formed into the elliptic shape in which the major axis is directed in the circumferential direction. In such a way, stresses to be concentrated on the through holes 4 during the run-flat running are spread to long hole walls extended in the circumferential direction of the through holes 4, thus making it possible to prevent the occurrence of the cracks efficiently.

In a case where each through hole 4 is formed into the elliptic shape in the third invention, it is recommended to make an adjustment so that a ratio of a to b can be 1.2 to 2.0, where a is a length of the elliptic shape in the major axis direction, and b is a length thereof in the minor axis direction. In such a way, the stresses concentrated in the width direction of the through holes 4 during the run-flat running can be spread in the circumferential direction of the through holes 4 more efficiently.

Each of modes of the through holes 4 according to the above-described three inventions in the run-flat supporting body 1 of the present invention can be adopted singly. In addition, each embodiment of the invention can be adopted in an arbitrary combination. When making such a combination, the effects of the present invention can be exerted more significantly.

As described above, in the run-flat supporting body 1 of the present invention, the peripheries of the respective through holes 4 formed in the wall surfaces of the annular shell 2 are thickened, or the peripheries of the through holes 4 are subjected to the shot peening treatment and the like to apply the residual stress to the peripheries of the through holes 4, or the through hole 4 is formed into the elliptic shape having the major axis in the circumferential direction. In such a way, the occurrence of the cracks starting from the through holes 4 during the run-flat running are prevented, thus making it possible to enhance the durability of the run-flat supporting body 1.

Furthermore, the run-flat supporting body 1 is attached to the tire/wheel assembly, thus enabling the vehicle to perform emergency running over a long distance.

Moreover, the run-flat supporting body 1 can be attached to the existing tire/wheel assembly, and accordingly, the run-flat supporting body 1 has also a structural advantage to be widely adoptable for the variety of existing tire/wheel assemblies.

The tire/wheel assembly according to the present invention has the run-flat supporting body in which the durability is enhanced as described above. Accordingly, a tire/wheel assembly in which the durability during the run-flat running is extremely good can be realized.

What is claimed is:

1. A run-flat supporting body including an annular shell and elastic rings,
   the annular shell on an outer peripheral side working as a supporting surface, the annular shell on an inner peripheral side bifurcating into two leg portions, the annular shell being provided with a large number of through holes in wall surfaces thereof; and the elastic rings being attached respectively to the two leg portions of the annular shell, and supporting the run-flat supporting body on a rim of a wheel,
   wherein peripheries of the respective through holes are more thickened than an outer region outside the peripheries of the respecive through holes and the thickness of the periphery of each through hole is made 1.3 to 1.8 times larger than that of the outer region.

2. The run-flat supporting body according to claim 1, wherein edges of the respective through holes are chamfered.

3. The run-flat supporting body according to claim 1, wherein a peripheral wall surface of each through hole is bent or folded back on any one side of the peripheral wall surface.

4. The run-flat supporting body according to claim 1, wherein a reinforcement member is bonded to a peripheral wall surface of each through hole.

5. A tire/wheel assembly, wherein the run-flat supporting body according to any one of claims 3 and 4 is attached to an inside of a pneumatic tire on the rim of the wheel.

* * * * *